United States Patent [19]

Arnaud

[11] Patent Number: 4,565,628
[45] Date of Patent: Jan. 21, 1986

[54] FILTER APPARATUS

[75] Inventor: Johnny Arnaud, Houston, Tex.

[73] Assignee: Hydrotreat, Inc., Houston, Tex.

[21] Appl. No.: 626,474

[22] Filed: Jul. 2, 1984

Related U.S. Application Data

[63] Continuation of Ser. No. 491,712, May 5, 1983, abandoned, and a continuation-in-part of Ser. No. 428,345, Sep. 29, 1982, abandoned.

[51] Int. Cl.⁴ .......................................... B01D 29/46
[52] U.S. Cl. ................................... 210/232; 210/451; 210/488
[58] Field of Search .............. 210/232, 488, 455, 450, 210/451

[56] References Cited

U.S. PATENT DOCUMENTS

| | | | |
|---|---|---|---|
| 437,289 | 9/1890 | Clark | 138/90 |
| 1,099,158 | 6/1914 | Baker | 138/89 |
| 2,064,569 | 12/1936 | Santucci | 138/89 |
| 2,424,449 | 7/1947 | Gasche | 138/89 |
| 2,493,452 | 1/1950 | Grigg | 138/89 |
| 2,662,663 | 12/1953 | Schmidt et al. | 220/235 |
| 2,665,877 | 1/1954 | MacGregor | 220/235 |
| 2,699,261 | 1/1955 | Britton et al. | 210/488 |
| 2,735,697 | 1/1956 | Zanin | 285/22 |
| 2,783,912 | 3/1957 | Hobbs | 220/46 |
| 2,870,794 | 1/1959 | Thaxton | 138/50 |
| 2,886,067 | 5/1959 | Maxwell et al. | 138/90 |
| 3,006,680 | 10/1961 | Gregory | 294/93 |
| 3,051,200 | 8/1962 | Bevington | 138/89 |
| 3,483,894 | 12/1969 | Finocchiaro | 138/90 |
| 3,494,504 | 2/1970 | Jackson | 220/24.9 |
| 3,648,843 | 3/1972 | Pearson | 210/488 X |
| 3,765,456 | 10/1973 | Karpenko | |
| 3,847,819 | 11/1974 | Firth | 210/451 X |
| 4,063,758 | 12/1977 | Westberg | 285/177 |
| 4,188,675 | 2/1980 | Ast | 4/295 |
| 4,282,982 | 8/1981 | Nuesslein | 220/237 |
| 4,283,289 | 8/1981 | Meyst et al. | 210/450 X |
| 4,303,101 | 12/1981 | Tholen | 138/89 |
| 4,358,377 | 11/1982 | Clark | 210/451 X |

FOREIGN PATENT DOCUMENTS

| | | | |
|---|---|---|---|
| 166561 | 3/1943 | Fed. Rep. of Germany . | |
| 54-145850 | 11/1979 | Japan . | |

*Primary Examiner*—John Adee
*Attorney, Agent, or Firm*—Arnold, White & Durkee

[57] ABSTRACT

A filter apparatus including a housing and a filter member retainable therein. The filter apparatus is adapted to be securable at a variety of positions relative to the housing. A wedging mechanism is provided whereby, when the filter element is placed in a desired location relative to the housing, the wedging mechanism may be engaged, thereby not only securing the filter member into position, but also preferrably forming an occlusive seal between the filter element and the housing. Fluid is introduced into the filter apparatus by first side of the filter element and is allowed to exit the filter apparatus from a second side of the filter element.

6 Claims, 9 Drawing Figures

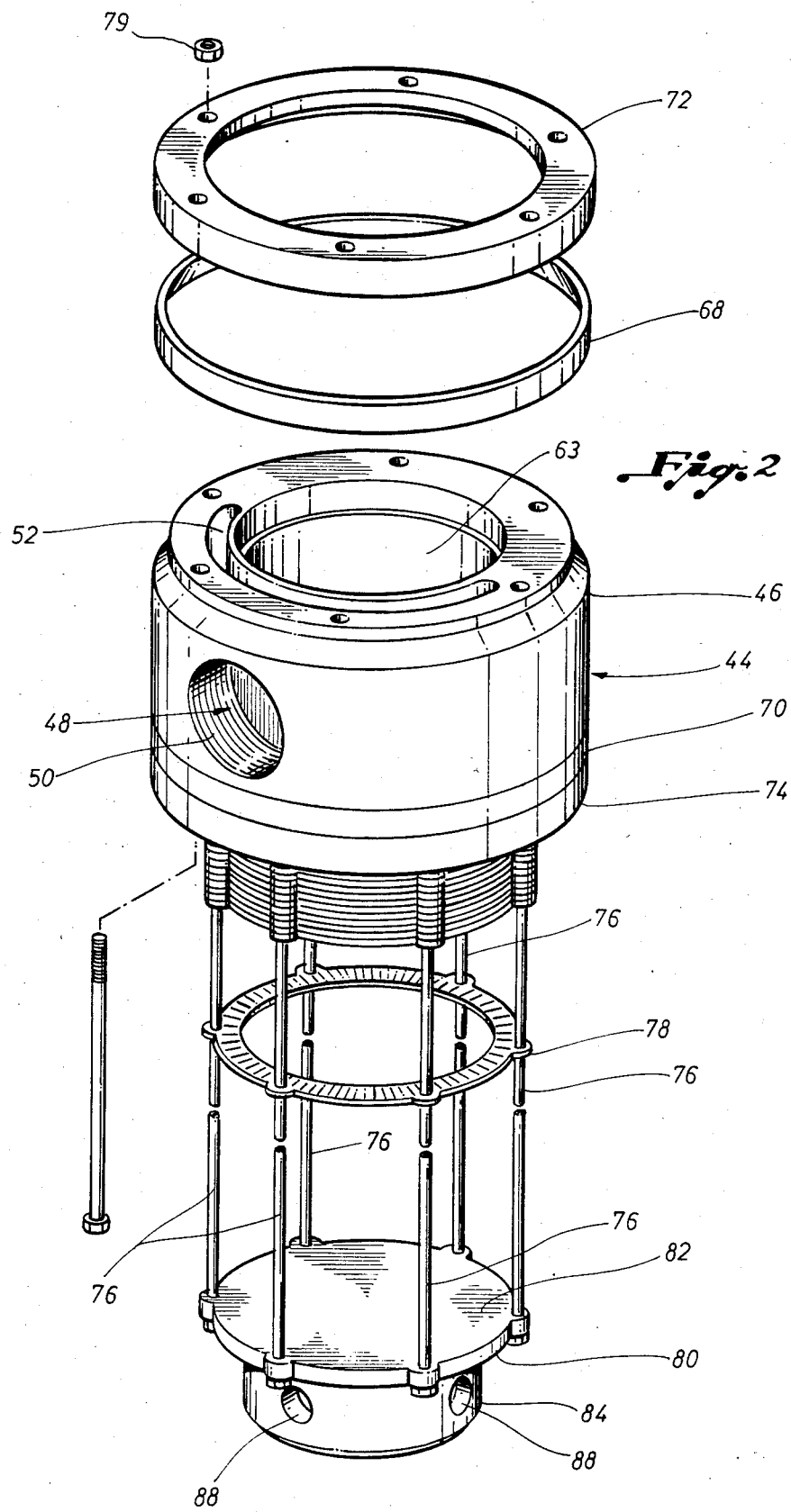

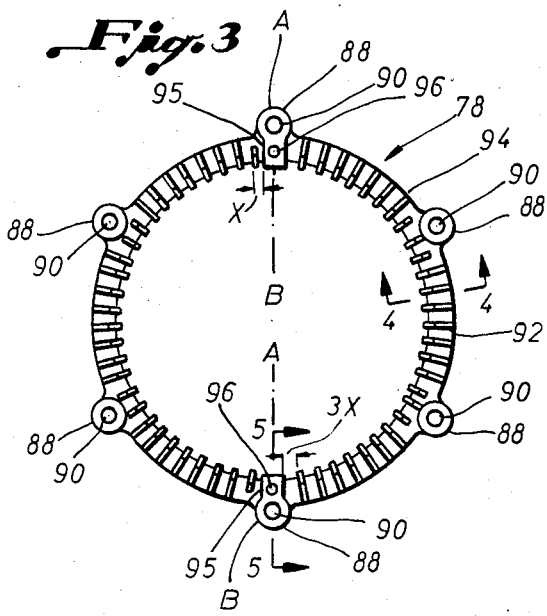
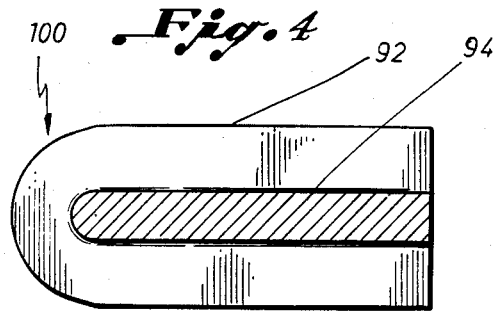
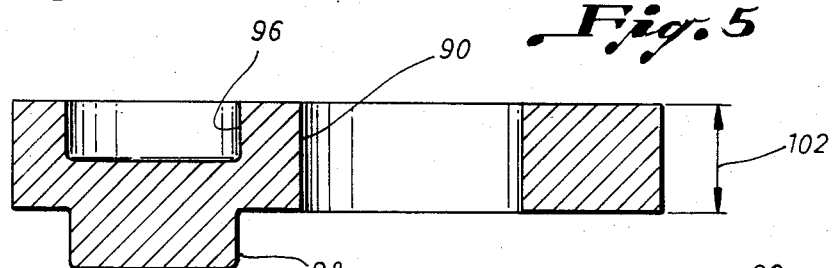
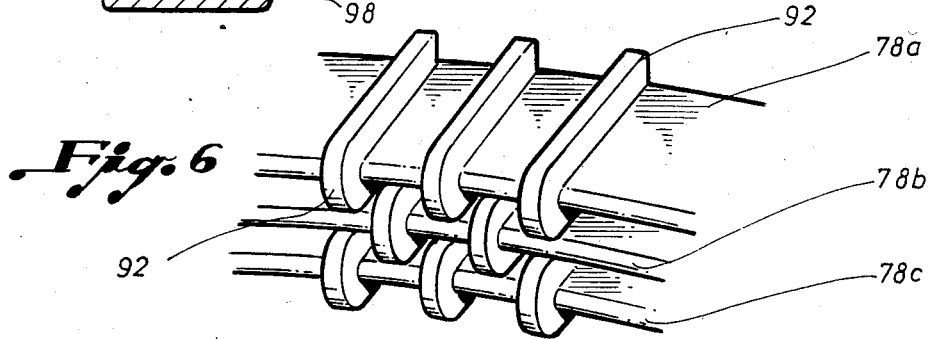
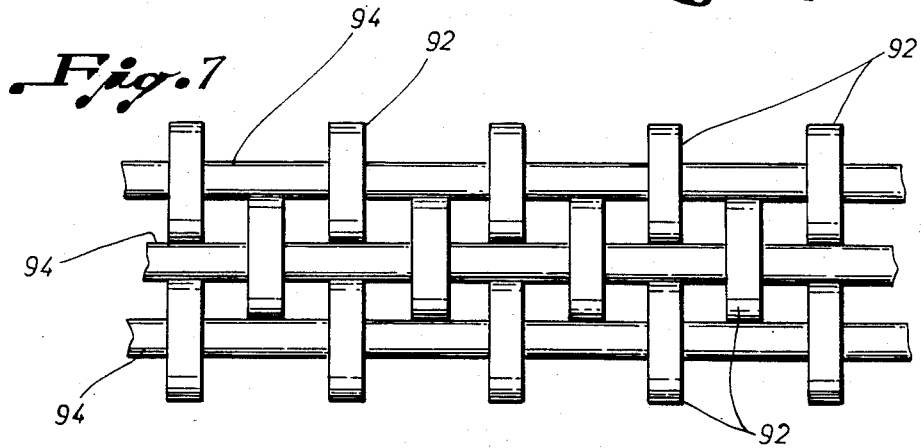

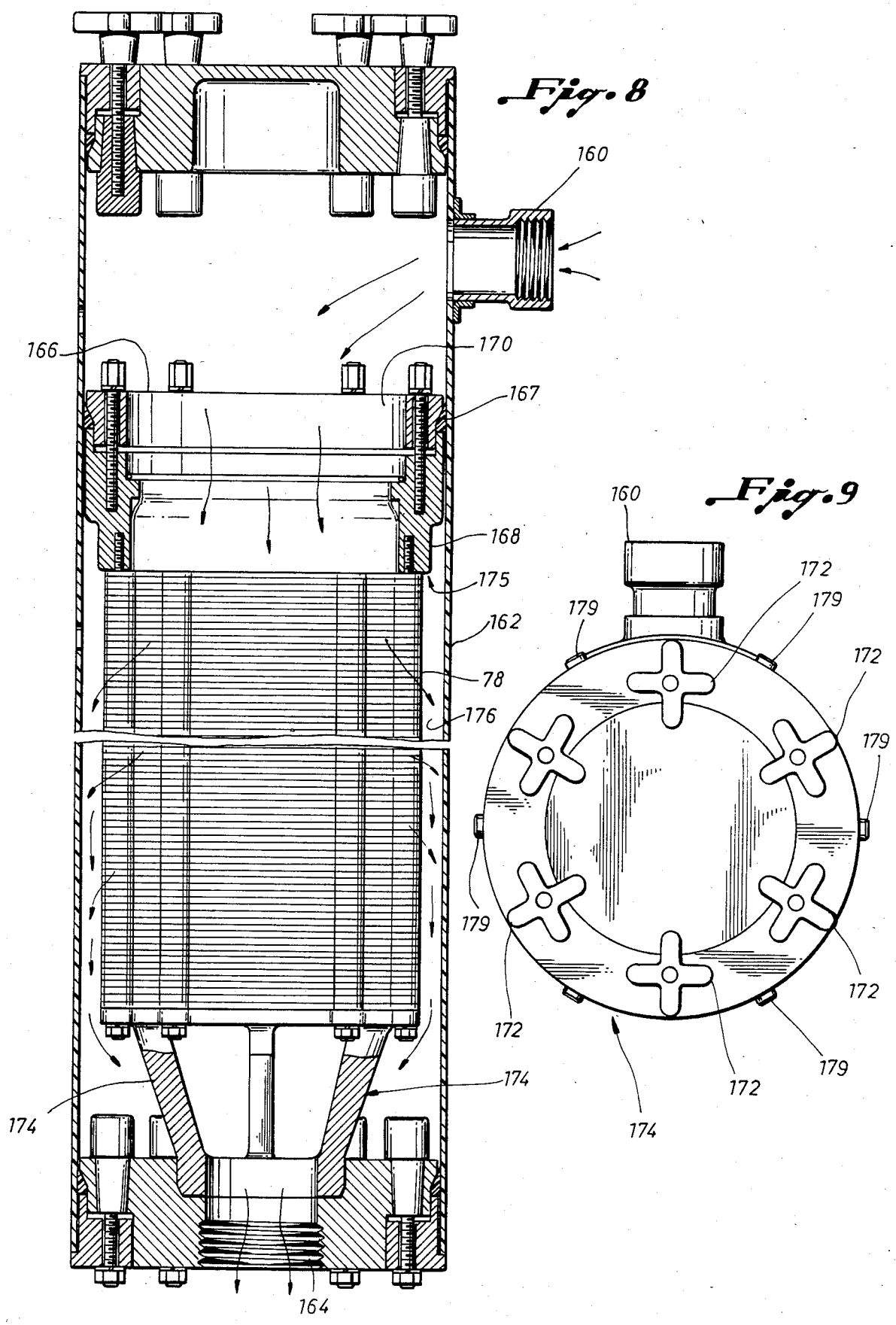

FILTER APPARATUS

This is a continuation, of application Ser. No. 491,712, filed 5/5/83 abandoned, and a continuation-in-part of co-pending application Ser. No. 428,345, filed Sept. 29, 1982 abandoned.

BACKGROUND OF THE INVENTION

The present invention relates generally to filter apparatus, and more specifically relates to filter apparatus containing filter members adapted to be adjustably securable within a housing to facilitate optimal removal and interchangeability of filter elements.

Many filter apparatus, particularly of those designed for use in industrial applications, include a conduit or housing and a rigid or semi-rigid filter element contained therein. As an example, many of these filter elements are of a generally cylindrical form and have an inlet end into which the fluid flows. Filtering occurs when the fluid flow passes through the radial surfaces of the filter element. It will be appreciated that the restriction of the filter element creates a pressure differential across the filter element which the element must withstand. It will further be appreciated that this pressure differential may take on significant proportions, particularly in high flow rate or high fluid pressure environments. Therefore, it is preferable to utilize a filter element which is of suitable construction to withstand high differential pressures and which is suitably supportable within the filter housing so as to provide optimal filter element durability and reliability.

In many applications, and particularly in industrial applications, it is not uncommon to encounter difficulty in manufacturing filter components within close tolerances such that parts are easily interchangeable. This is particularly true with respect to filter elements which tend to be of materials which are less rigid and much more difficult to form than machinable parts. Filter elements are typically expected to be removed at periodic intervals for servicing or replacement. At these times, it is often desirable that the filter element be quickly removable to minimize down time of the fluid system. Further, it is often preferable that the filter element be replacable with another element. Because of the difficulty in exact dimensional duplication discussed above, to accomplish this end, prior art methods have typically relied upon either spring mechanisms or boltably adjustable mechanisms to support the filter element, such mechanisms typically located at one end of the filter element. Spring mechanisms have an inherent drawback in that they, by design, have a resiliency which; (a) places a compression load on a filter element when it is in an unpressured state and, (b) will yield when fluid pressure builds to a threshold level and thereby cease to properly support the filter element. Boltably adjustable mechanisms as found in the prior art are not only typically troublesome and time-consuming to adjust, often requiring multiple "trial and error" fittings, but also are often impractical in many environments such as in filter apparatus used in systems containing corrosive fluids.

Accordingly, the present invention provides a method and apparatus wherein a filter element is relatively easily removable from a filter apparatus and is adjustable for variations in filter element construction tolerances, which provides a solid support for the filter member, and which is suitable for use in corrosive environments.

SUMMARY OF THE INVENTION

The filter apparatus of the present invention includes a housing having fittings or orifices through which a fluid may enter and exit the housing. A filter element is retained within the housing and is adapted to be wedgedly secured to the housing at a plurality of positions. In the preferred embodiment, the housing is of a generally cylindrical form and the filter element includes a mounting member which is also of a generally cylindrical form and which is slightly insertable into the housing. The mounting member contains at least one groove along its radial peripheral surface such groove having one extremity tapered to the outer surface of the mounting member. Retained within the groove and cooperatively engaging to tapered surface thereof, is a flexible annular sealing ring adapted to engage the internal surface of the housing. A ring, at least partially insertable into the groove, is adapted to be drawn into an increasingly proximal relation to the mounting member such that the ring acts upon the flexible annular seal forcing it radially outwardly whereby it will wedgedly seal between the mounting member and the housing, thereby securing the mounting member in relation to the housing and providing an occlusive seal therebetween. A porous filter member is attached to one surface of the mounting member and placed in fluid communication with one side of the mounting member. The opposite side of the filter member is placed in fluid communication with the exit aperture of the housing. Also in a particular preferred embodiment, a contact block is provided at the distal end of the porous filter member and a mechanism provided whereby this contact block is generally retained in position relative to said housing.

BRIEF DESCRIPTION OF THE DRAWINGS

FIG. 2 is a perspective view showing the assembly of the filter element of the filter apparatus of FIG. 1.

FIG. 3 is a top view of a single mesh ring of the filter element of FIG. 2.

FIG. 4 is a cross-sectional view of a single mesh ring, taken along lines 4—4 in FIG. 3.

FIG. 5 is a cross-sectional view of a mesh ring index tab, taken along line 5—5 in FIG. 3.

FIG. 6 is an internal view of an intended assembly of three mesh rings.

FIG. 7 is an extension drawing depicting the effective mesh of the assembled rings of FIG. 6.

FIG. 8 is a cross sectional view of an alternative embodiment of a filter apparatus in accordance with the present invention.

FIG. 9 is a top view of the filter apparatus of FIG. 8.

DETAILED DESCRIPTION OF A PREFERRED EMBODIMENT

Figure 1:
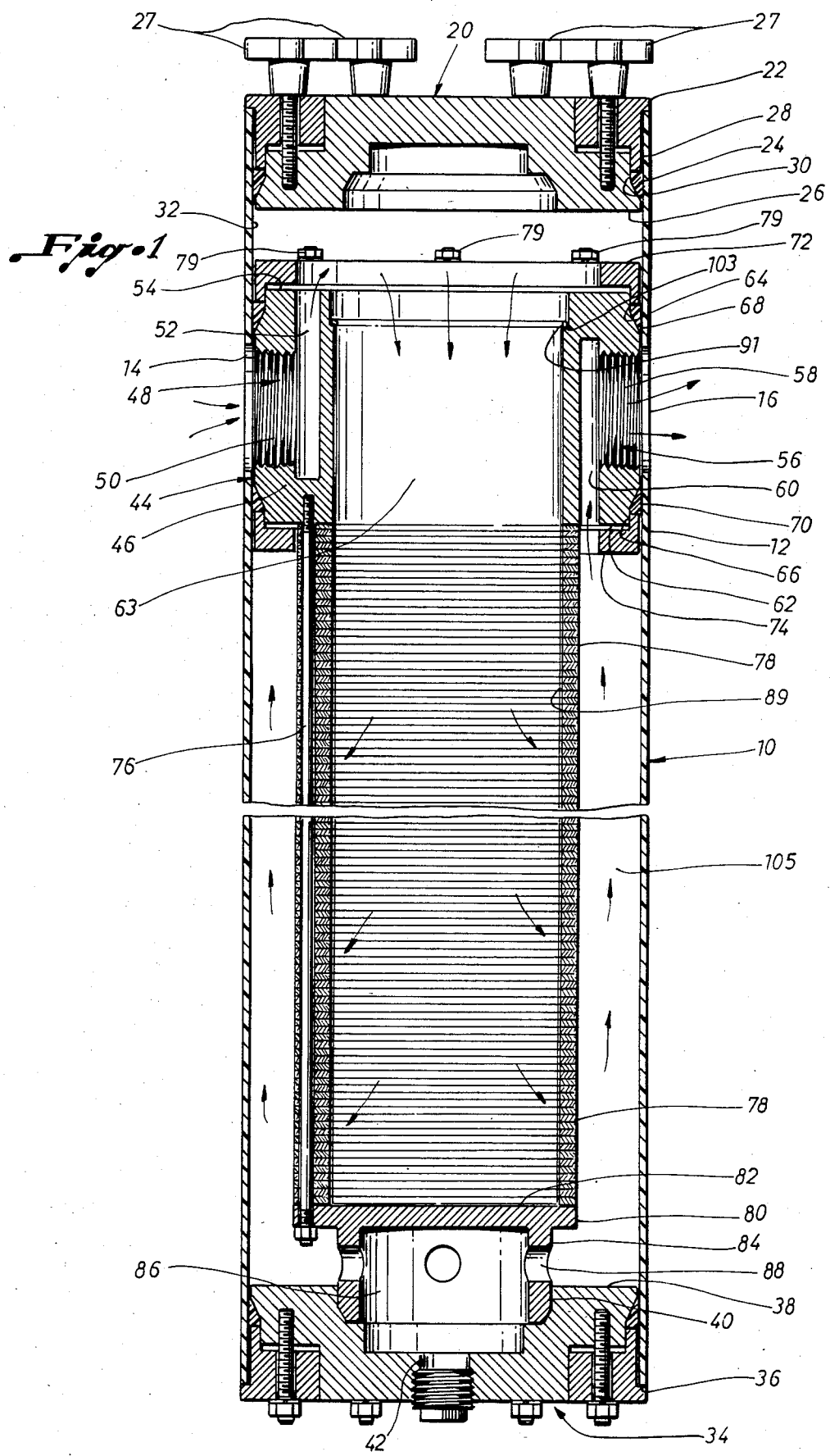
FIG. 1 is a sectional view of a filter apparatus constructed in accordance with the present invention.

Referring now to the drawings in more detail, and particularly to FIG. 1, therein is illustrated a filter apparatus 10 in accordance with the present invention. Filter apparatus 10 includes a housing 12 which is preferably of a generally cylindrical form and may be constructed of any relatively rigid material adapted to withstand the pressures and conditions of the intended environment. Housing 12 includes an inlet port 14 and an outlet port 16 through which fluid may enter and exit, respectively, filter apparatus 10. Housing 12 is sealed at a first end 18 by an end cap 20 having a wedge-shaped annular seal of the type described in my co-pending application, Ser. No. 428,345 entitled "Weld-Free All Pupose Seal For Closed Fluid Systems", the specification of which is incorporated herein by reference. Briefly, first end seal 20 includes a ring body 22, flexible annular seal 24, and a wedge block 26. Ring body 22 is secured in position relative to housing 12 by a plurality of pins (not illustrated) extending therebetween. A plurality of bolts 27 extend through ring block 24 into wedge block 26 to facilitate the drawing of the two parts into increasingly proximal relation to one another. A downwardly-extending flange 28 along the radial periphery of ring body 22 fits within a groove 30 around the peripheral surface of wedge block 26, in which annular seal 24 is placed. The lower surfaces of both groove 30 and annular seal 24 have complimentary, cooperatively engagable tapered surfaces such that as bolts 27 are rotated, drawing ring body 22 and wedge block 26 towards one another, the tapered surfaces in groove 30 and on annular seal 24 cause annular seal 24 to be forced radially outward, thereby sealably engaging with internal surface 32 of housing 12.

Second end seal 34 is affixed to second end 36 of housing 12 in a manner similar to that discussed above with respect to first end seal 20. As will be discussed more fully later herein, second end seal wedge block 38 preferably has a recess 40 formed therein. Also, as will be discussed later herein, it is often desirable that recess 40 be coupled by means of a sealable aperture 42 to the exterior of filter apparatus 10.

Referring now to FIGS. 1 and 2, therein in FIG. 2 is shown filter element 44 in perspective view, showing block 46 contains inlet passage 48 composed of an inlet aperture 50, which may preferably contain threads or other suitable means for coupling a conduit to mounting block 46, and an aperture 52 extending to upper surface 54 of mounting block 46. Aperture 52 preferably extends along a radius for a less-than-semicircular dimension around mounting block 46. Similarly, mounting block 46 contains an exit passage 56 composed of an exit aperture 58, which also may contain threads or other means for coupling to a conduit, and an aperture 60 extending to lower surface 62 of mounting block 46. Aperture 60 preferably also extends along a radius for a less-than-semicircular direction around mounting block 46. This partially circular form of apertures 52 and 60 maintains the flow area into and out of filter apparatus 10. By forming apertures 52 and 60 of less than semi-circular form, they may be placed along the same radius of mounting block 46. Mounting block 46 also contains upper and lower vertical peripheral grooves, 64 and 66, respectively. The central portions of grooves 64 and 66 have tapered surfaces comparable both to that in groove 30 in upper wedge block 26 and to that found on lower wedge 38. Disposed within each groove 64 and 66 is a flexible annular seal 68 and 70, appropriately oriented to cooperate with the tapered surfaces of grooves 64 and 66. Boltably secured to mounting block 46 are upper and lower ring bodies 72 and 74, respectively. It will be appreciated that no pins are required to hold mounting block 46 in position because, unlike end seals 20 and 34, mounting block 46 is supported by fluid pressure on both lateral sides. Any bias in fluid pressure will be on the inlet side of mounting block 46, biasing filter element 44 to an increasingly secure position.

Threadably secured to mounting block 46 and extending from lower surface 62 thereof, are a plurality of rods 76 spaced at preferably equal intervals around a given radius of mounting block 46. Stacked and assembled on rods 76 are a plurality of mesh rings 78 which will be described more fully in relation to FIGS. 3 thru 7. Coupled to rods 76, at the lower end of stacked mesh rings 78, is bottom cap 80 which preferably will present a solid upper surface 82 to the stack of mesh rings 78 and will have a downwardly extending block 84 which is preferably of a cylindrical form. As will be discussed more fully later herein, it is often desirable that block 84 have a central, downwardly opening recess 86 and a plurality of apertures 88 extending from recess 86 to the exterior of block 84.

In an intended application of filter element 44, a porous filter element such as a filter bag 89 is disposed within the assembled stack of mesh rings 78 in a manner known to the art. Bag 89 may be retained in place by a wire ring 91 affixed to, or integral with, bag 89, ring 91 resting on a shoulder 103 in aperture 63 within mounting block 46.

Referring now to FIG. 3, therein is illustrated a single mesh ring 78, depicted from a top view. Mesh ring 78 is of a generally circular shape and contains preferably externally extending abutments 88 to facilitate suitable enclosures around apertures 90 through which the rods (76 in FIGS. 1 and 2) will pass. A plurality of ribs 92 preferably extend above and below body 94 of mesh ring 78. In a preferred embodiment, ribs 92 are equidistantly spaced around semicircular portions of mesh ring 78, although, as will be apparent from the discussion to follow, in other embodiments it may be preferable for ribs 92 to be placed at other spacings on body 94. Viewing mesh ring 78 along diameter line "A-B", it will be seen that a plate 95 containing an orienting recess 96 and tab (98 in FIG. 5) is found radially adjacent abutment A and abutment B. It will also be seen that, moving counterclockwise from abutment "A", first rib 92 is located a distance "X" from the adjacent edge of plate 95. Still moving counterclockwise, the remainder of ribs 92 are then, in this particular preferred embodiment, spaced a distance of 3X from the nearest edge of the previous adjacent rib 92. Starting now at abutment "B" and moving counterclockwise, it will be seen that the closest rib 92 is spaced a distance 3X from the nearest adjacent edge of plate 95. The remainder of ribs 92 in this second half of mesh ring 78 are then similarly spaced 3X from the adjacent edge of the next preceding rib 92.

It will be seen that each rib 92 preferably represents a generally rectangular form when viewed from a position above or below mesh ring 78 and proximate the axis thereof. It is to be understood that other forms of ribs 92 may effectively be utilized without departing from the scope of the invention. For example, ribs 92 could be formed so as to present a generally trapezoidal form to a view from above or below as described above, the broader of the two parallel surfaces of the trapezoidal rib oriented to the exterior of mesh ring 78 so as to define a rectangular path between adjacent ribs 92 or, also, for example, the trapezoidal ribs might be oriented with the longer side oriented to the interior of mesh ring 78 to facilitate a filter flow path form such as that commonly referred to in the trade as "wedge wire" associated with filter materials.

Referring now to FIG. 4, therein is illustrated a cross-sectional view of mesh ring 78 along line 4—4 in FIG. 3, showing the profile of a preferred form of rib 92. In this particularly preferred embodiment, inner end 100 of rib 92 has a radius so as to present a bowed or rounded shoulder to the inside of mesh ring 78. It will be noted that rib 92 preferably extends equidistantly above and below body of mesh ring 78.

Referring now to FIG. 5, therein is illustrated a cross-sectional view of mesh ring 78 along line 5—5 in FIG. 3, depicting plate B. Directly beneath orienting recess 96 is orienting tab 98. The height 102 of plate B is preferably generally that of each rib 92.

Referring now to FIGS. 4 and 6, therein is shown in FIG. 6 a portion of a stacked assembly of three mesh rings 78 in an intended assembled configuration. For clarity, only a few ribs 92 on each ring 78 have been shown. It will be noted that the ribs 92 of center mesh ring 78B are interposed between the vertically aligned ribs 92 of upper and lower mesh rings 78A and 78C. This interposition or offset is achieved in the mesh ring assembly by orienting vertically adjacent rings 180° out of phase with one another, i.e., orienting plate A above plate B over plate A of the tiered rings. The above-described asymmetrical spacing of the ribs between the two halves of mesh ring 78 establish the rib offset.

FIG. 7 is an extension view of a filter constructed in accordance with the present invention as shown in FIG. 6, With the fore-shortening of ribs 92 removed, it is possible to see the effective mesh presented to fluid flow within the filter element.

It will be apparent to those skilled in the art that many materials may be used for the construction of mesh rings 78. It is envisional that for most applications, moldable materials such as plastics, in some instances fiber-filled, will be a suitable and optimally cost effective material for mesh rings 78.

It will be appreciated that many alterations in the form of mesh rings 78 as illustrated in this particular preferred embodiment may be made without departing from the scope of the present invention. It will further be appreciated that while the mesh pattern illustrated is a particularly preferred embodiment, other patterns of meshes known to those skilled in the art may be mechanically constructed by appropriate alterations in the construction of mesh rings 78, and particularly in the form or dimensions of ribs 92 and their arrangement on body 94 of mesh ring 78.

Referring again to FIG. 1, when filter element 46 is fully assembled, the stack of mesh rings 78, along with bottom plate 80, are secured by nuts to rod 76 such that a generally rigid unit is formed. With first end cap 70 removed, filter element 44 may be slidably inserted into housing 12. Block 84 of bottom cap 80 enters recess 40 in lower wedge block 38 and filter element 44 may be inserted into housing 12 until block 84 is firmly seated within recess 40. Filter element 44 may then be rotated within housing 12 until inlet aperture 48 is aligned with aperture 14 and exit aperture 58 is aligned with aperture 16. When filter element 44 is properly located, bolts 79 extending through upper and lower mounting rings 74 and 76, respectively, and mounting block 46 are tightened so as to draw upper and lower mounting rings 74 and 76 centrally toward mounting block 46, thereby urging flexible sealing rings 68 and 70 into sealing engagement with inner surface 36 of housing 12. It will be appreciated that the position of filter element 44 within housing 12 is limited only by registry of mounting block apertures 48 and 58 with apertures 14 and 16 in housing 12. By forming apertures 14 and 16 in housing 12 of longitudinally-oriented oval forms, an extended range of adjustment may be facilitated.

In the operation of filter apparatus 10, as will be appreciated from the arrows indicating flow, the fluid flow will enter inlet passage 48 and flow to the top of mounting block 46 and then down through aperture 63 to a location adjacent the stack of mesh rings 78, whereat the fluid may flow through filter bag 89 and mesh rings 78 into annulus 105 surrounding filter element 46. The fluid may then enter aperture 60 and exit filter apparatus 10 through outlet aperture 56.

In many applications, it is desirable to have provisions for cleansing, or "blowing down" of the filter apparatus. In the depicted embodiment this is facilitated by the removal of plug 107 in aperture 42, thereby permitting fluid to pass through apertures 88 and recess 86 in block 84 to exit filter apparatus 10 thereby, carrying any accumulated sludge or particulate matter from filter apparatus 10.

Referring now to FIG. 8, therein is shown an alternative embodiment of a filter apparatus 150 in accordance with the present invention. The essential functions of the components are similar to those described in response to the discussion of the previous embodiment and only the pertinent differences will be discussed here. It will be seen that an inlet fitting 160 is affixed to the exterior of housing 162. Similarly, an exit aperture 164 is located within second end wedge block 166. Accordingly, mounting block 168 does not require the inlet and outlet aperture provisions of the prior embodiment and has only a central longitudinal aperture 170. Further, because of the different inlet and outlet structure, mounting block 166 does not require the two spaced annular seals of the previous embodiment. Therefore, mounting block 166 contains only one groove 167 and is cooperatively engaged with only one ring body 168. It will be seen that the stack of mesh rings 78 are coupled to ring body 168 rather than to mounting block 166. The annular seal around mounting block 166 is activated in a manner similar to that described earlier with regard to the first end cap (20 in FIG. 1) of the previous embodiment. The bottom plate is preferably extended, relative to the previous embodiment, and contains extending struts 174 so as to provide minimal restrictions to fluid flow toward exit aperture 164. It will be appreciated that without the restriction of achieving registry with apertures in the housing, filter element 175 may be located at virtually any desired longitudinal location within housing 162. It will further be appreciated that this facilitates the adjustment of filter element length by adding or subtracting mesh rings 78 as may be desired. Thus, the filter element may be adjusted in response to various conditions or environments without changing the filter housing.

FIG. 9 is a top view of the filter apparatus of FIG. 8 showing the general form thereof and depicting securing bolts 172 by which upper end seal 174 is secured to housing 162. Also depicted are pins 175 extending between housing 162 and the wedge block of upper end seal 179.

The operation of this alternative embodiment is again similar to that described with regard to the previous embodiments. The fluid will enter filter apparatus 150 through inlet fitting 160, flow into aperture 170 in mounting block 166, through mesh rings 78 into annulus 176 and out of filter apparatus 150 through exit aperture 164.

Many modifications and variations may be made in the methods and apparatus described herein and depicted in the accompanying drawings without departing substantially from the concept of the present invention. Accordingly, the proceeding discussion is exemplary only and is not intended to limit the scope of the present invention.

What is claimed is:

1. A filter apparatus, comprising:
   a housing, said housing being sealed at a first end thereof;
   a filter element, comprising,
      a mounting member, said mounting member including a first peripheral groove, said first peripheral groove extending from a first surface of said mounting member, said mounting member including a second peripheral groove extending from a second surface of said mounting member, at least a portion of each of said first and second grooves being tapered,
      a first flexible sealing member disposed within said first groove,
      a first ring at least partially insertable into said first groove, and
      means for causing said first ring to enter said first groove and to cause said sealing member to wedge against the inner surface of said housing,
      a second flexible sealing member disposed within said second groove,
      a second ring at least partially insertable into said second groove, and
      means for causing said second ring to enter said second groove and cause said second sealing member to wedge against the inner surface of said housing.

2. A filter apparatus, comprising:
   a housing, said housing sealable at a first end thereof;
   a filter element, said filter element comprising,
      mounting means positionable at one of a plurality of longitudinally spaced positions within said housing, said mounting means comprising,
         a mounting block, said mounting block having a first circumferential groove extending around said mounting block from a first lateral surface thereof, said first groove having a tapered portion extending to the periphery of said mounting block, said mounting block further comprising a second circumferential groove extending around said mounting block from a second lateral surface thereof, said second groove having a tapered portion extending to the periphery of said mounting block,
         a first flexible sealing member disposed within said first groove, said first sealing member having a tapered surface cooperatively engaged with said tapered surface of said first groove,
         a first ring member cooperatively engaged with said first groove in said member block
         means for causing said first ring member to move relative to said first groove and to act upon said first sealing member,
         a second flexible sealing member disposed within said second groove, said second sealing member having a tapered surface cooperatively engaged with said tapered surface of said second groove,
         a second ring member cooperatively engaged with said second groove in said mounting block, and
         means for causing said second ring member to move relative to said second groove and to act upon said second flexible sealing member,
      a porous member extending from said mounting means, and
      a contact plate coupled to said porous member,
   a contact surface against which said contact plate may rest; and
   means for sealing a second end of said housing.

3. The apparatus of claim 2, further comprising means for introducing a fluid flow into said filter apparatus at a location intermediate of said first and second circumferential grooves of said mounting block.

4. A filter apparatus, comprising:
   a generally cylindrical housing, said housing sealed at one end;
   means for sealing said housing at a second end;
   a filter element, comprising,
      a mounting block, said mounting block having a first circumferential groove extending around said mounting block from a first lateral surface thereof, said first groove having a tapered portion extending to the periphery of said mounting block, said mounting block further including a second circumferential groove extending around said mounting block from a second lateral surface thereof, said second groove having a tapered portion extending to the periphery of said mounting block,
      a first flexible sealing member disposed within said first groove, said first sealing member having a tapered surface cooperatively engaged with said tapered surface of said first groove,
      a first ring member cooperatively engaged with said first groove in said mounting block,
      means for causing said first ring member to move relative to said first groove and to act upon said first flexible sealing member,
      a second flexible sealing member disposed within said second groove, said second sealing member having a tapered surface cooperatively engaged with said tapered surface of said second groove,
      a second ring member cooperatively engaged with said second groove in said mounting block, and
      means for causing said second ring member to move relative to said second groove and to act upon said second flexible sealing member;
      a porous member extending generally longitudinally from a second lateral surface of said mounting block,
      a contact block secured at the distal end of said porous member,
   means for supporting said contact block relative to said housing;
   means for introducing a fluid flow into said filter apparatus on a first side of said porous member; and
   means for allowing a fluid flow to exit said filter apparatus from a second side of said porous member.

5. The apparatus of claim 4, wherein said means for introducing a fluid into said filter apparatus is located intermediate said first and second grooves on said mounting block.

6. The apparatus of claim 4, wherein said means for allowing a fluid flow to exit said filter apparatus is located intermediate said first and second grooves on said mounting block.

* * * * *